United States Patent [19]

Olsson

[11] 3,765,239
[45] Oct. 16, 1973

[54] FLOW MEASURING DEVICE
[75] Inventor: Sven-Gunnar Sigvard Olsson, Sollentuna, Sweden
[73] Assignee: Siemens Aktiengesellschaft, Erlangen, Germany
[22] Filed: Mar. 22, 1971
[21] Appl. No.: 126,549

[30] Foreign Application Priority Data
Mar. 25, 1970 Sweden.............................. 4096/70

[52] U.S. Cl.................. 73/194 R, 73/228, 128/2.08
[51] Int. Cl................................................ G01f 1/00
[58] Field of Search.................. 73/1, 194 E, 194 R, 73/228; 128/2.08, 142, 142.4, 188, DIG. 17

[56] References Cited
UNITED STATES PATENTS
3,424,000   1/1969   Chelner et al....................... 73/228
FOREIGN PATENTS OR APPLICATIONS
1,508,303   11/1967   France............................... 128/2.08

OTHER PUBLICATIONS

Melville, A. W. et al., A Servo Operated Respirator for Premature Infants, IRE Transactions on Medical Electronics, Dec. 1958, p. 75–81.

Primary Examiner—Richard C. Queisser
Assistant Examiner—John P. Beauchamp
Attorney—Richards & Geier

[57]    ABSTRACT

A device is used for measuring the flow of media flowing in conduits, particularly of breathing gas directed to and/or from a patient in respirators. The device is particularly characterized by actuating means for setting the device in a zero position when the passage of the flow is zero.

3 Claims, 1 Drawing Figure

PATENTED OCT 16 1973
3,765,239
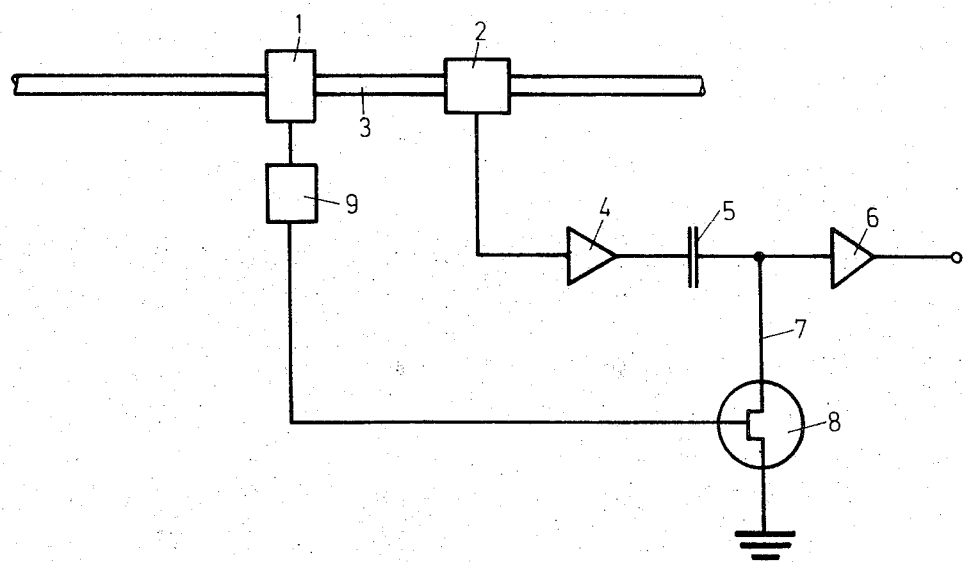
INVENTOR
SVEN-GUNNAR SIGVARD OLSSON

FLOW MEASURING DEVICE

This invention relates to a device for measuring the flow of media flowing in conduits, particularly of breathing gas directed to and/or from a patient in respirators.

When a respirator is used it is desirable to measure the gas flow to and/or from a patient so as to be able to control whether the amount of gas breathed out by the patient is equal to the amount of gas provided by the respirator. From such measurements can be determined, for example, whether there is a leak in the conduits between the respirator and the patient. In the case of respirators with servo-actuation the measurement can be also used as a regulating value for keeping constant a desired flow. To provide convenient indication or further actuation of the result of measuring, the measurement should consist of an electrical signal.

A flow measurer suitable for the measuring of breathing gas flow must be constructed by taking into consideration that the pressure drop in the measurer is very small and in the case of a flow of 1 L/sec. sec. should if possible not exceed the value 1 cm $H_2O$. Flow measurers are known which fulfill these requirements and at the same time are comparatively cheap. However, these cheap flow measurers have the drawback that they are comparatively unstable with respect to zero shifting due to the necessarily required very high amplification. Other known flow measurers which are less unstable in this respect are considerably more expensive and more complicated. However, for flow measurers of respirators it is absolutely necessary that the zero shifting should be small. Furthermore, these flow measurers must have a wide measuring range. In addition, measuring errors which sometimes occur should be held as small as possible in small flow values as well.

An object of the present invention is the provision of a device of the described type wherein there is no shifting of the zero position, so that there can be practically no more measuring errors; this has also the advantage that simple and cheap flow measurers can be used without detrimentally affecting the entire function of the device.

Other objects of the present invention will become apparent in the course of the following specification.

In the accomplishment of the objectives of the present invention it was found desirable to provide actuating means for setting the zero position of the device whenever there is a zero passage of the flow. This zero flow passage is preferably determined by an indicator which is separate from the actual flow measurer.

The present invention utilizes the fact that the breathing-in flow as well as the breathing-out flow are equal to zero during a part of the breathing cycle. If the device is set to zero each time when the breathing cycle passes through zero, then the zero error can never be greater than that which takes place during a single breathing cycle even when there are several cycles which follow each other. Thus the device of the present invention has an advantage over prior art devices wherein in the case of several breathing cycles which follow each other the appearing total zero error is the sum of zero errors which took place in the individual breathing cycles.

According to a preferred embodiment of the present invention the setting of the zero position takes place with the closing of a valve regulating the flow. This makes certain that the device will have a zero position at the time when the flow is actually zero.

In a device according to the present invention which produces an electrical signal corresponding to the size of the flow, the zero setting takes place preferably in that the signal, if necessary after previous amplification, is transmitted through a condenser to an amplifier of high-inlet impedance and the amplification inlet is placed at the zero potential whenever there is a closing of the valve depending upon the switching means operated by valve movement. The operation of the switching means in order to supply the zero potential to the amplifier inlet takes place advantageously by means of an actuating impulse which is produced by a photocell device sensing the valve movement during the closing of the valve.

Advantageously a field effect transistor is used as the switching means.

The invention will appear more clearly from the following detailed description when taken in connection with the accompanying drawing the sole FIGURE of which is a diagram showing the main circuit connections of the device of the present invention.

The Drawing shows an actuating valve 1 and a flow measurer 2. The valve 1 regulates the flow of the flowing medium in a conduit 3, while the flow measurer 2 is used to measure the strength of the flow passing through the conduit 3.

The conduit 3 consists preferably of an in-breathing and out-breathing conduit of a respirator having servo-actuation. Thus the valve 1 and the measurer 2 are used for actuating and measuring the flow of breathing gas in the conduit 3.

The flow measurer 2 consists substantially of a resistance strain gauge introduced into the conduit 3, the strain gauge being bent depending upon the strength of the flowing breathing gas. Each bending of the resistance strain gauge produces a change in resistance of a resistance bridge circuit. An electrical signal produced at the outlet of the bridge circuit due to change in resistance is then always proportional to the strength of flow.

The resistance strain gauge must be of small size to keep low pressure drop over the strain gauge in the conduit 3. Thus a comparatively weak signal is produced which must be amplified in order to be subjected to further operations. This amplification takes place in an amplifier 4 connected to the outlet of the flow measurer 2.

The amplified signal is then transmitted through a condenser 5 to a further amplifier 6 having a higher inlet impedance. The signal appearing at the outlet of this amplifier 6 can be either transmitted directly to an indicating device for indicating the strength of flow or it can be used for servo-actuation of the respirator.

The inlet of the amplifier 6 can be connected with zero potential (ground) by a line 7 as well as by a field effect transistor 8 serving as a switch. The actuation of the transistor 8 takes place depending upon the movement of the valve 1, by a photo-cell device 9 which senses the valve movement.

The operation of the device of the present invention is as follows:

Tensions take place in the pressure strain gauge due to temperature variations or, for example, changes in the position of the strain gauge in the conduit 3, which cause a zero shifting at the outlet of the flow measurer 2. Temperature variations or, for example, position changes of the strain gauge thus may cause an indication of a flow value at the end of each breathing cycle although actually there is no flow.

The influence of such zero position errors upon the measured result is avoided by placing the transistor 8 into conducting condition each time during zero position of the flow, namely, connecting the inlet of the amplifier 6 to the zero potential. The time for the switching on of the transistor 8 is fixed by an actuating impulse which is produced by the photo-cell device 9 at the moment when the actuating valve closes, namely, when the flow is zero.

During the time period when the inlet of the amplifier 6 is connected to the zero potential, the condenser 5 receives the voltage value which corresponds to the zero error. When the transistor 8 is switched out again no substantial change in the charge of the condenser 5 takes place due to the high inlet impedance of the amplifier 6. Thus the voltage corresponding to a zero point shifting at the outlet of the first amplifier 4 does not affect any more the inlet of the amplifier 6, so that at the outlet of the amplifier 6 there is only a signal which is proportional to the momentary value of the flow in the conduit 3.

If there is a further shifting of the zero position in one of the following breathing cycles, this shifting will have no effect since after the following closing of the transistor 8 the condenser 5 will receive this new value and thus this new zero point shifting cannot have any effect upon the amplifier 6.

The present invention results in that an eventually appearing zero point error cannot proceed to indication or to further treatment any more, so that erroneous measuring results or erroneous operation of the respirator are avoided. Since every measuring result is independant from zero point errors, comparatively simple and cheap flow measurers can be used. This greatly simplifies the entire structure of the device of the present invention and its costs are considerably lowered.

I claim:

1. A device for measuring the flow of a medium, such as breathing gas, said device comprising a conduit for the medium, an actuating valve located in the conduit and regulating the flow of the flowing medium in the conduit, and a flow measurer located in the conduit and producing an electrical signal, said signal being a measure for the strength of the flow passing through the conduit, said device further comprising a capacitor connected to the signal-output of said flow measurer, a signal-amplifier connected to said capacitor and having a high-ohmic input impedance, switching means connected to the input of said amplifier, and actuating means connected to said switching means and to said valve, said actuating means operating said switching means depending on the movement of said valve to place the amplifier input at zero potential when the valve is closed.

2. A device in accordance with claim 1, wherein the actuating means comprise a photo-cell device sensing the valve movement and producing an actuating impulse for the switching means when the valve closes.

3. A device in accordance with claim 2, wherein said switching means comprise a field effect transistor actuated by the actuating impulse of the photo-cell device.

* * * * *